May 18, 1926.
E. A. KEELER
OPTICAL PYROMETER
Filed Oct. 22, 1923
1,585,152
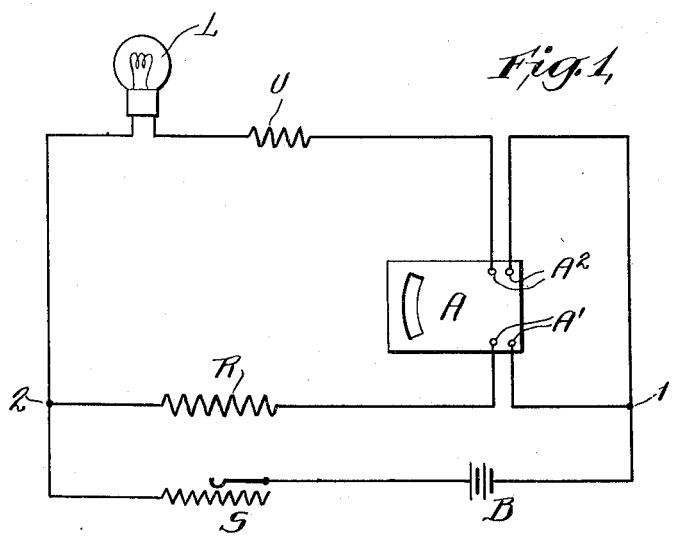
Fig. 1,
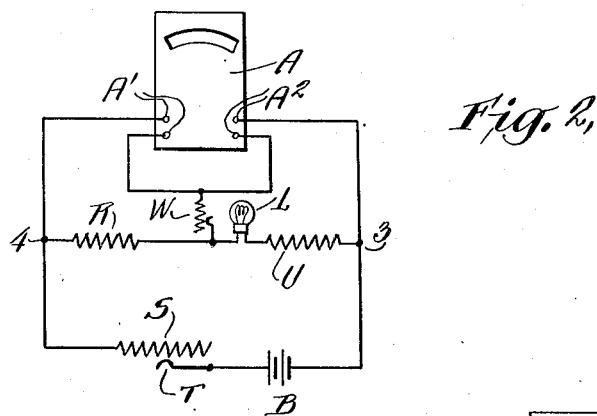
Fig. 2,
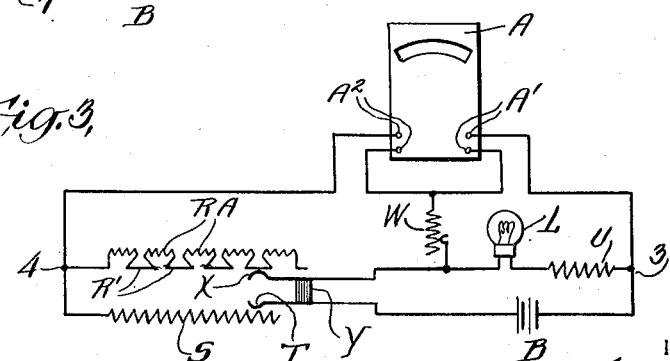
Fig. 3,
INVENTOR
*Earl A. Keeler*
BY
*John E. Hubbell*
ATTORNEY Patented May 18, 1926.

1,585,152

UNITED STATES PATENT OFFICE.

EARL A. KEELER, OF PHILADELPHIA, PENNSYLVANIA, ASSIGNOR TO BROWN INSTRUMENT COMPANY, OF PHILADELPHIA, PENNSYLVANIA, A CORPORATION OF PENNSYLVANIA.

OPTICAL PYROMETER.

Application filed October 22, 1923. Serial No. 670,144.

The general object of the present invention is to provide simple and accurate means for measuring the temperature of the filament of an electric pyrometer lamp, and thereby determining the object temperature with which the lamp filament temperature may be brought into correspondence. My invention is characterized by the fact that I associate one winding of a differential meter with the pyrometer lamp, and associate the other winding of the meter with a standard resistance, or resistor of known resistance, through which an electric current is passed from the same source which supplies the energizing current to the lamp in such fashion that the deflections of the meter needle will measure the relative change in resistance of the resistor and lamp filament, as the lamp filament resistance increases and decreases in accordance with the changes in its temperature resulting from an increase or decrease in the energizing current flow through it. Distinctive advantages of the invention are found in the relative simplicity, low cost of manufacture and small weight and bulk of the apparatus required to secure temperature determinations of a desirably high accuracy.

The various features of novelty which characterize my invention are pointed out with particularity in the claims annexed to and forming a part of this specification. For a better understanding of the invention however, its advantages and specific objects attained with its use, reference should be had to the accompanying drawings in which I have diagrammatically illustrated and described various embodiments of my invention.

Of the drawings:

Fig. 1 is a diagram illustrating one form of the invention;

Fig. 2 is a diagram illustrating a second form of the invention; and

Fig. 3 is a diagram illustrating a third form of the invention.

In the form of my invention illustrated diagrammatically in Fig. 1, A represents a differential ammeter A having two windings A' and A² of which the terminals only are shown. The meter A is associated with the pyrometer lamp L, a standard resistance, or resistor R of known resistance, a source of electric current B, and a rheostat S in the following manner. The resistor R and the meter winding A' are connected in series with one another between circuit points 1 and 2, to which current is supplied by a circuit branch which includes the current source B and the rheostat S in series with one another; and the lamp L and the meter winding A² are connected between the point 1 and 2, in series with one another and in parallel with the circuit branch including the resistor R and the meter winding A'.

In practice the resistance of the resistor R is so chosen with respect to the resistance of the lamp L, and to the meter deflecting effects of the two windings of the meter A, that the meter will give a zero deflection at some desirable point in the temperature range of the filament of the lamp L. If the deflecting effects of the two windings of the meter are equal when the currents flowing through those windings are equal, then the resistance of the lamp L will be equal to that of the resistor R at the zero deflection condition of the meter A. If the apparatus is intended to measure temperatures varying from 1200° F. to 1800° F., for instance, the neutral position of the needle of the meter A may well correspond either to a temperature of 1200° F. or of 1500° F. In the latter case when the resistance of the rheostat S is decreased and the current flow through the resistor R and the lamp L is increased to raise the temperature of the lamp filament above 1500° F., the increased resistance of the lamp filament resulting from its increased temperature will diminish the deflecting effect of the meter winding A² relative to the deflecting effect of the winding A', and the meter needle will swing in one direction, while when the resistance of the rheostat S is increased to diminish the temperature of the lamp filament below 1500° F. the resultant reduction in resistance of the lamp filament consequent upon its reduction in temperature will cause the meter needle to swing in the opposite direction from the zero position. With the apparatus suitably calibrated, the needle deflection will be proportional to the temperature change in the lamp filament and the scale of the meter may be graduated in temperature degrees. If the zero position of the meter needle is at the low temperature end of the scale, 1200° F. on the assumption made above, the meter obviously will only read temperatures at or above and not below, the temperature corresponding to the zero or neutral position of the meter needle.

To make it possible to use different pyrometer lamps with the same resistor R and meter A, the lamps may each be made of a resistance at the temperature corresponding to the zero position of the meter needle, which is somewhat less than that required to balance the resistance of the resistor R, and whatever additional resistance is required in the lamp circuit to give the zero reading at the proper temperature may be provided by a separate calibrating resistance U permanently associated with each such lamp.

In lieu of connecting the pyrometer lamp L and resistor R in parallel with one another, and each in series with a corresponding winding of the meter A as in Fig. 1, it is advantageous in some cases to connect the lamp L and resistor R in series with one another between circuit points 3 and 4 with the meter winding A' in a shunt about the resistor R, and the winding A² in a shunt about the lamp L and its calibrating resistance U, as shown in Fig. 2. The current source B and rheostat S are connected in series with one another between the points 3 and 4. In this case the currents flowing through the winding A' and A² of the meter A, vary in response to variations in the voltage drop through the resistor R and through the lamp L. Variations in the resistance characteristics of the lamp L at higher temperatures may be compensated for in this arrangement, by the variations in the potential drop in a resistor W through which the connected terminals of the meter winding A' and A² are connected to the connected terminals of the resistor R and lamp L. An increase in the amount of resistance in the resistor W diminishes the scale deflection of the meter resulting from a given change in lamp filament resistance. Aside from the regulating effect of a resistor W, the operations of the apparatus shown in Fig. 2 is essentially the same in principle and effect as that of the apparatus shown in Fig. 1, as will be recognized without further explanation by those skilled in the art.

In Fig. 3 I have illustrated a modification of the apparatus shown in Fig. 2, in which the resistor R is replaced by a resistor RA divided into sections so associated with the rheostat S, that as successive portions of its resistance each of some magnitude are progressively cut into or out of circuit, successive sections of the resistor RA are cut into and out of circuit, but more or less of each such portion of the resistance of the rheostat S may be cut into or out in circuit without changing the number of sections of the resistor RA in circuit. This result may be obtained in various ways, of which the one illustrated in Fig. 3, consists in connecting the different sections of the resistor R by bar conductors R' along each of which the slider contact X travels during a corresponding adjustment of the slider contact T of the rheostat S to permit of a corresponding change in the amount of the resistance of the rheostat S in circuit, without changing the number of sections of the resistor RA in circuit. As shown in Fig. 3 the slider contacts X and T are both connected to the same movable support Y. With the arrangement shown in Fig. 3 the zero or neutral position of meter A, will correspond to different lamp filament resistances and temperatures, accordingly as more or less of the sections of the resistor RA are connected in circuit. With the slider contact X in engagement with any particular conductor R', the actual temperature measured will be equal to the lamp temperature giving the neutral meter reading with the particular number of sections of the resistor RA then in circuit, plus or minus the temperature indicated by the deflection of the meter needle. The resistor RA may thus in effect constitute a temperature scale, each section of the resistor corresponding to a temperature scale unit of convenient magnitude, say 100° F., or 200° F., each such unit being preferably somewhat smaller than the scale range of the meter A. While with the apparatus shown in Fig. 3, variations in the voltage of the source of current B make it impossible to obtain accurate temperature measurements by merely measuring the amount of resistance in circuit with the lamp L and source B, the accuracy of the measurements based as above described, on the number of sections of the resistor RA in circuit, are not appreciably affected by such variations in voltage of the source B, as occur in ordinary practice if the resistance of each individual sections of the resistor RA and of the corresponding portions of the resistance of rheostat are made large enough. In such case the effect of variations in the supply voltage is substantially neutralized or compensated by the adjustments of the resistance of the rheostat S in circuit which are made without varying the number of sections of the resistor RA in circuit.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new, and desire to secure by Letters Patent, is:

1. In an optical pyrometer system, the combination with a lamp, of a resistor of known resistance, a source of current supplying current to the lamp and the resistor, and a differential meter having one winding associated with said lamp and a second winding associated with said resistor and adapted to indicate by its deflections the extent of the variations in relative resistance of said resistor and lamp occurring as the lamp temperature is varied.

2. In an optical pyrometer system, the combination with a lamp, of a resistor of known resistance, a source of current connected in series with said resistor and lamp, and a differential meter having one winding connected in shunt to said resistor and having its other winding connected in shunt to said lamp and adapted to indicate by its deflections the extent of the variations in relative resistance of said resistor and lamp occurring as the lamp temperature is varied.

3. In an optical pyrometer system, the combination with the lamp, of a resistor of known resistance, a source of current connected in series with said resistor and lamp, and a differential meter having one winding connected in a shunt about said resistor and having its other winding connected in a shunt about said lamp by means comprising a resistor forming a part of each of said shunts said meter being adapted to indicate by its deflections the extent of the variations in relative resistance of said resistor and lamp occurring as the lamp temperature is varied.

4. In an optical pyrometer system, the combination with a pyrometer lamp, of a resistor of known resistance, a source of current, and a rheostat, said lamp, resistor, current source, and rheostat being connected in series, and a differential meter having one winding connected in shunt to said resistor and having its other winding connected in shunt to said lamp and adapted to indicate by its deflections the extent of the variations in relative resistance of said resistor and lamp occurring as the lamp temperature is varied.

5. In an optical pyrometer system, a combination with a lamp, of a resistor composed of sections of known resistance, a common current source supplying current to the lamp and to the resistor, a differential meter having one winding associated with the lamp and having its other winding associated with said resistor to indicate the variations in relative resistance of said lamp and the sections of said resistor in circuit as the lamp temperature is varied, a rheostat for varying the current supplied by said source to said lamp and resistor, and means associated with said rheostat for varying the number of resistor sections in circuit on a considerable adjustment of said rheostat while permitting a smaller adjustment of the rheostat without varying the number of resistor sections in circuit.

6. In an optical pyrometer system, the combination with a pyrometer lamp, of a resistor of known resistance, a source of current and a rheostat, said lamp, resistor, current source, and rheostat being connected in series, a differential meter having one winding connected in shunt to said resistor and having its other winding connected in shunt to said lamp, and means associated with said rheostat for varying the resistance of said resistor in circuit in steps of substantial amount when the resistance of the rheostat in circuit is correspondingly varied while permitting a smaller adjustment of the rheostat resistance in circuit without varying the amount of resistance of the resistor in circuit.

Signed at Philadelphia in the county of Philadelphia and State of Penna., this fifteenth day of October, A. D. 1923.

EARL A. KEELER.